US012757821B2

(12) United States Patent
Roome

(10) Patent No.: US 12,757,821 B2
(45) Date of Patent: Oct. 13, 2026

(54) SUSPENDED HOVER MOWER DEVICE

(71) Applicant: Mark Roome, Wimberley, TX (US)

(72) Inventor: Mark Roome, Wimberley, TX (US)

( * ) Notice: Subject to any disclaimer, the term of this patent is extended or adjusted under 35 U.S.C. 154(b) by 247 days.

(21) Appl. No.: 18/794,064

(22) Filed: Aug. 5, 2024

(65) Prior Publication Data

US 2025/0143209 A1 May 8, 2025

Related U.S. Application Data

(60) Provisional application No. 63/595,765, filed on Nov. 3, 2023.

(51) Int. Cl.
*A01D 34/64* (2006.01)
*A01D 75/28* (2006.01)
*A01D 34/80* (2006.01)
*A01D 101/00* (2006.01)

(52) U.S. Cl.
CPC ........... *A01D 34/64* (2013.01); *A01D 75/287* (2013.01); *A01D 34/80* (2013.01); *A01D 2101/00* (2013.01)

(58) Field of Classification Search
CPC ....... A01D 34/64; A01D 34/80; A01D 75/287
See application file for complete search history.

(56) References Cited

U.S. PATENT DOCUMENTS 4,206,580 A * 6/1980 Truax .................. A01D 34/866 56/16.2
5,005,344 A * 4/1991 McCracken ........... A01D 34/63 56/14.7
5,435,117 A * 7/1995 Eggena .................. A01D 34/64 56/10.2 D
5,666,794 A * 9/1997 Vought ................... A01D 41/16 172/112
5,706,638 A * 1/1998 Kinder ................. A01D 34/475 56/11.9
5,946,893 A * 9/1999 Gordon .................. A01D 34/74 56/15.8
10,470,364 B1 * 11/2019 Odom .................. A01D 34/866
10,961,684 B1 * 3/2021 Brown ..................... E02F 5/282
11,564,356 B2 * 1/2023 Grice ...................... A01G 3/085
11,903,340 B1 * 2/2024 Bungart ............... A01D 34/866
(Continued)

FOREIGN PATENT DOCUMENTS

CA 2762380 A1 * 6/2012 ........... A01D 34/835
WO WO-9921406 A1 * 5/1999 ............... B60G 3/01

*Primary Examiner* — Claude J Brown
(74) *Attorney, Agent, or Firm* — Brennan, Manna & Diamond, LLC

(57) ABSTRACT

A suspended mower device is disclosed which is a tool engineered explicitly for efficiently mowing terrains with challenging attributes. The suspended mower device comprises a compact tractor or skid steer that supports an attachment component configured to support a mower over inclined areas. The attachment component comprises a dual unistrut or dual square tubing and chains which allow the mower component to hover. As the mower hovers above the surface, the cutting blades consistently engage with the grass, ensuring an even cut. Further, a set of wheels affixed to the mower offer stabilization on all terrains. Additionally, the compact tractor has a hydrostatic drive, which acts to control the mower's speed and the tractor's bucket control is used to adjust the mower's height, angle, and orientation.

19 Claims, 4 Drawing Sheets

(56) References Cited

U.S. PATENT DOCUMENTS

| | | | | |
|---|---|---|---|---|
| 2002/0059788 | A1 * | 5/2002 | Velke | A01D 34/64 56/14.7 |
| 2004/0128969 | A1 * | 7/2004 | Meurer | A01D 34/64 56/229 |
| 2008/0256918 | A1 * | 10/2008 | Kubinski | A01D 34/74 56/17.1 |
| 2010/0011733 | A1 * | 1/2010 | Godfrey | A01D 34/662 56/17.5 |
| 2019/0183043 | A1 * | 6/2019 | Lapp | A01D 34/74 |

* cited by examiner

SUSPENDED HOVER MOWER DEVICE

CROSS-REFERENCE TO RELATED APPLICATION

The present application claims priority to, and the benefit of, U.S. Provisional Application No. 63/595,765, which was filed on Nov. 3, 2023, and is incorporated herein by reference in its entirety.

FIELD OF THE INVENTION

The present invention relates generally to the field of suspended mower devices. More specifically, the present invention relates to a suspended, side-attached mower applied to grassy areas with slopes that are difficult and time-consuming to mow. Accordingly, the present disclosure makes specific reference thereto. Nonetheless, it is to be appreciated that aspects of the present invention are also equally applicable to other like applications, devices and methods of manufacture.

BACKGROUND

By way of background, this invention relates to improvements in suspended mower devices. Generally, weed eating grassy areas near lakes, ponds, ditches, and other inclined or sloped areas can be difficult, frustrating, and very time consuming. These areas are generally dangerous and can lead to people accidentally falling into a body of water with the possibility of encountering wildlife, such as snakes, alligators, etc.

Further, the use of spinning lines or blades to cut grass, weeds, or foliage is common knowledge. However, most prior art wheeled cutting mechanisms have been designed at helping the user to maintain an even horizontal grass cut or simply to aid the user in carrying the weight burden of the trimming device during use. Many trimming devices exist either in the form of hand-held units or carriages to cradle hand-held units. Other existing units are simply hand-held trimmers with wheels. Some of these carriages have telescopic handles but do not offer a means to allow the user the ability to safely mow steep hills or banks from a long distance. Available technology always keeps the user very close to the unit, which is unsafe.

Accordingly, there is a demand for an improved suspended mower device that efficiently mows terrains with challenging attributes, such as uneven slops, inclines, and proximity to bodies of water, like, ponds, lakes, as well as sand bunkers on golf courses. More particularly, there is a demand for a suspended mower device that includes a compact tractor with an attachment that supports a mower over inclined areas.

Therefore, there exists a long felt need in the art for a suspended mower device that provides users with an attachment for skid steers and compact tractors capable of suspending a mower. There is also a long felt need in the art for a suspended mower device that features a dual unistrut device that suspends the mower via chains to the tractor bucket. Further, there is a long felt need in the art for a suspended mower device that allows users to raise or lower the mower with the tractor's loader controls to safely mow grass and weeds on the slope. Moreover, there is a long felt need in the art for a device that saves many hours of weed eating while improving safety, preventing people from having to carry heavy string trimmers near bodies of water. Further, there is a long felt need in the art for a suspended mower device that suspends a mower to make it much easier and more convenient to mow sloped and inclined areas. Finally, there is a long felt need in the art for a suspended mower device that utilizes chains to keep the mower slightly elevated on the slope to be mowed.

The subject matter disclosed and claimed herein, in one embodiment thereof, comprises a suspended mower device. The device is a tool engineered explicitly for efficiently mowing terrains with challenging attributes. The suspended mower device comprises a compact tractor or skid steer that supports an attachment component configured to support a mower over inclined areas. The attachment component comprises a dual unistrut and chains which allow the mower component to hover. As the mower hovers above the surface, the cutting blades consistently engage with the grass, ensuring an even cut. Further, a set of wheels and adjustable rollers affixed to the mower offer stabilization on all terrains. Additionally, the compact tractor has a hydrostatic drive, which acts to control the mower's speed and the tractor's bucket control is used to adjust the mower's height, angle, and orientation.

In this manner, the suspended mower device of the present invention accomplishes all of the forgoing objectives and provides users with a device that delivers an even grass cut across varied terrains. The device utilizes a compact tractor with an attachment component for the mower. The device can be attached to various tractor models.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a suspended mower device. The device is a tool engineered explicitly for efficiently mowing terrains with challenging attributes, such as uneven slopes, inclines, and proximity to bodies of water, like, ponds, lakes, as well as sand bunkers on golf courses. The suspended mower device comprises a compact tractor or skid steer that supports an attachment component configured to support a mower over inclined areas. As the mower hovers above the surface, the cutting blades consistently engage with the grass, ensuring an even cut, even on inclined slopes and uneven terrain.

In one embodiment, the suspended mower device provides steep hill and inclined area mowing capabilities. The device allows a user to mow steep slopes with minimal effort and in a manner to maximize safety, utility, and minimize physical strain. The user can easily maintain control of the device from long distances, when performing mowing activities on steep slopes and inclines that cannot be cut with current available techniques. Thus, the presently disclosed device is designed to allow users to mow steep hills and inclines regardless of physical strength and abilities and with minimal effort and minimal risk.

In one embodiment, the suspended mower device is configured to secure to a compact tractor or skid steer. Typically, the device is anchored to the front bucket of a compacted tractor or skid steer. The anchoring not only offers balance but also assures adaptability as the device is modular and can be paired with diverse tractor and skid steer models. Generally, the suspended mower device can be used with any suitable compact tractor or skid steer as is known in the art, depending on the needs and/or wants of a user.

In one embodiment, the suspended mower device is secured to the compact tractor or the skid steer via an attachment component. The attachment component can be any suitable securing means as is known in the art. Typically, the attachment component comprises a tubular rod with opposing first and second ends. The first end is secured to the bucket of the compact tractor or skid steer via any suitable securing means as is known in the art. The first end can be removably secured via clamps, bolts, screws, etc., to the bucket. The opposing second end secures to a dual unistrut or another suitable component. Thus, in position, the attachment component supports a mower over inclined areas. Accordingly, the mower's foundational stability is vested in its primary attachment to the front bucket of a compact tractor or skid steer.

In one embodiment, the device is secured to a compact tractor or a skid steer without a bucket via a quick connect/disconnect component. Typically, the quick connect/disconnect component comprises a bar with two hooks with two movable wedges secured on it. The two hooks are secured over a round, metal bar positioned on the front of the compact tractor or skid steer. The movable wedges are positioned under the hook and slide up behind the metal bar and are secured in place via screws. The wedges act to retain the hooks on the metal bar of the compact tractor or skid steer. The quick connect/disconnect component would be utilized when the compact tractor or skid steer does not have a bucket or has a hydraulic boom extension, etc.

In one embodiment, the attachment component is then secured to a dual unistrut or dual square tubing. The attachment component is secured to the dual unistrut or dual square tubing via any suitable securing means as is known in the art, such as welding, bolts, screws, etc. The dual unistrut or dual square tubing serves as a frame and is the anchor point for the chains that secure the mower. Specifically, the dual unistrut or dual square tubing comprises a pair of tubular bars arranged in a parallel configuration secured to a horizontal support bar creating the frame. The pair of tubular bars and horizontal support bar would typically be welded together in an H-shape or other suitable configuration to create the frame support for the device.

In one embodiment, the dual unistrut or dual square tubing is then secured to a plurality of chains, which is then secured to the mower. The plurality of chains are secured to the dual unistrut or dual square tubing via a ring, clevis, or a hook, etc., or any other suitable securing means as is known in the art. The chains can be adjusted in terms of their length and ensure that the mower retains a forward orientation and movement, regardless of the terrain's angular variations. Anchored at the terminal points of the chains is a mower. The chains are secured to the mower via a ring, clevis, or a hook, etc., or any other suitable securing means as is known in the art.

In one embodiment, the mower of the device is a grass trimming tool composed of a wheeled or hovering platform with a central motor which can be gas powered or hydraulic, and a rotary blade mechanism. The rotary blade mechanism delivers the actual mowing action. As the mower hovers above the surface, the cutting blades consistently engage with the grass, ensuring an even cut. Further, the mower includes a set of diminutive wheels which are affixed to the mower's base. The wheels offer stabilization on all terrains. The wheels can be any suitable wheels as is known in the art.

In one embodiment, the mower comprises adjustable rollers between the wheels, which act as guides. The adjustable rollers ensure that the mower's orientation remains level throughout its operation. The rollers can be smooth or grooved. The adjustable rollers can be any suitable size and shape as is known in the art. The desirable roller diameter is from one (1) to three (3) inches.

In one embodiment, the compact tractor or the skid steer employs a hydrostatic drive. Thus, for optimal maneuverability, the device is ideally operated in conjunction with the hydrostatic drive of the compact tractor or skid steer. Such an arrangement provides nuanced control over the mower's speed, which is indispensable when navigating tricky terrains, such as inclines and steep slopes. Ideally, the hydrostatic drive will vary speed and maintain best cutting performance of the mower.

In one embodiment, the device utilizes the compact tractor or the skid steer's bucket controls. Specifically, a user can deftly adjust the mower's height, angle, and orientation via the bucket controls, thus ensuring precision in every movement of the mower.

In one embodiment, the mower is driven by the hydraulic motor from the compact tractor or skid steer. In another embodiment, the mower is gas powered.

In one embodiment, the suspended mower device is an industrial configuration for commercial use.

In one embodiment, the suspended mower device with its hovering capability promises an even grass to cut across varied terrains. By melding the power of a compact tractor with the precision of a hovering mechanism, the device effortlessly blends efficiency, safety, and precision.

In yet another embodiment, the suspended mower device comprises a plurality of indicia.

In yet another embodiment, a method of suspending a motor to mow a sloped or inclined area is disclosed. The method includes the steps of providing a suspended mower device comprising an attachment component with a dual unistrut or dual square tubing and chains and a mower. The method also comprises securing the chains to the mower. Further, the method comprises securing the chains to the dual Unistrut or dual square tubing. The method also comprises securing the dual unistrut or dual square tubing to the attachment component. The method also comprises securing the attachment component to a compact tractor or skid steer. The method comprises controlling the mower's speed via the hydrostatic drive of the compact tractor or skid steer. Further, the method comprises adjusting the mower's height, angle and orientation via the compact tractor's bucket control. Finally, the method comprises hovering the mower over an inclined surface to consistently engage with the grass to cut it.

Definitions

Dual Unistrut: Fixed frame.

Square Tubing: Slide out movement/horizontal outward adjustment. The slide adjustment can be mechanical and pinned at desired length or hydraulic cylinder operated by skid steer or tractor hydraulic system.

Unistrut-Dual Fixed Length Frame

Used when variable extension is not necessary.

Square Tubing-Dual Tubing Frame

Allows various extension settings either pinned or by hydraulics. Tubing inside of tubing to slide inward or outward.

Types of Frames

Light Weight: All aluminum constructed for small compact tractor. Lighter in weight for less strain on tractor.

Medium Duty: Steel bucket or skid steer mount with aluminum slide. Mower frame produces less weight when fully extended.

Heavy Duty: Steel bucket or skid steer mount with steel slide. Mower frame system is stronger and has a larger extension range. Made for heavier tractors.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
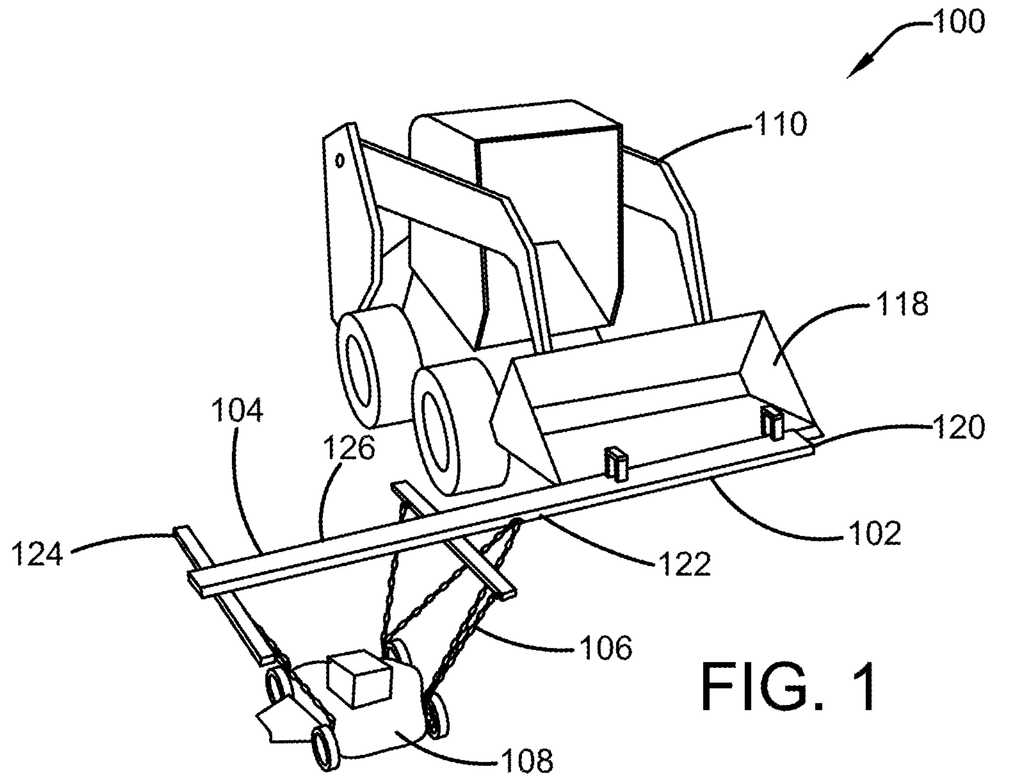
FIG. 1 illustrates a perspective view of one embodiment of the suspended mower device of the present invention showing the mower attached to a skid steer bucket in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a suspended mower device that provides users with an attachment for skid steers and compact tractors capable of suspending a mower. There is also a long felt need in the art for a suspended mower device that features a dual unistrut or dual square tubing device that suspends the mower via chains to the tractor bucket. Further, there is a long felt need in the art for a suspended mower device that allows users to raise or lower the mower with the tractor's loader controls to safely mow grass and weeds on the slope. Moreover, there is a long felt need in the art for a device that saves many hours of weed eating while improving safety, preventing people from having to carry heavy string trimmers near bodies of water. Further, there is a long felt need in the art for a suspended mower device that suspends a mower to make it much easier and more convenient to mow sloped and inclined areas. Finally, there is a long felt need in the art for a suspended mower device that utilizes chains to keep the mower slightly elevated on the slope to be mowed.

The present invention, in one exemplary embodiment, is a novel suspended mower device. The suspended mower device comprises a compact tractor or skid steer that supports an attachment component configured to support a mower over inclined areas. The attachment component comprises a dual unistrut or dual square tubing and chains which allow the mower component to hover. As the mower hovers above the surface, the cutting blades consistently engage with the grass, ensuring an even cut. Further, a set of wheels affixed to the mower offer stabilization on all terrains. Additionally, the compact tractor has a hydrostatic drive, which acts to control the mower's speed and the tractor's bucket control is used to adjust the mower's height, angle, and orientation. The present invention also includes a novel method of suspending a motor to mow a sloped or inclined area. The method includes the steps of providing a suspended mower device comprising an attachment component with a dual unistrut or dual square tubing and chains and a mower. The method also comprises securing the chains to the mower. Further, the method comprises securing the chains to the dual Unistrut or dual square tubing. The method also comprises securing the dual unistrut or dual square tubing to the attachment component. The method also comprises securing the attachment component to a compact tractor or skid steer. The method comprises controlling the mower's speed via the hydrostatic drive of the compact tractor or skid steer. Further, the method comprises adjusting the mower's height, angle and orientation via the compact tractor's bucket control. Finally, the method comprises hovering the mower over an inclined surface to consistently engage with the grass to cut it.

Referring initially to the drawings, FIG. 1 illustrates a perspective view of one embodiment of the suspended mower device 100 of the present invention. In the present embodiment, the suspended mower device 100 is an improved suspended mower device 100 that provides a user with a means for mowing sloped or inclined areas 112. Specifically, the suspended mower device 100 comprises an attachment component 102 with a dual unistrut or dual square tubing 104 and adjustable chains 106 which secure to a mower 108. Further, a compact tractor or skid steer 110 supports the attachment component 102, which is configured to support the mower 108 over inclined areas 112. As the mower 108 hovers above the surface, the cutting blades 114 consistently engage with the grass 116, ensuring an even cut, even on inclined slopes and uneven terrain 112. The wheels and rollers provide a smooth performance over all terrains.

Generally, the suspended mower device 100 provides steep hill and inclined area 112 mowing capabilities. The device 100 allows a user to mow steep slopes 112 with minimal effort and in a manner to maximize safety, utility, and minimize physical strain. The user can easily maintain control of the device 100 from long distances, when performing mowing activities on steep slopes and inclines 112 that cannot be cut with current available techniques. Thus, the presently disclosed device 100 is designed to allow users to mow steep hills and inclines 112 regardless of physical strength and abilities and with minimal effort and minimal risk.

Further, the suspended mower device 100 is configured to secure to a compact tractor or skid steer 110. Typically, the device 100 is anchored to the front bucket 118 of a compacted tractor or skid steer 110. The anchoring not only offers balance but also assures adaptability as the device 100 is modular and can be paired with diverse tractor and skid steer models 110. Generally, the suspended mower device 100 can be used with any suitable compact tractor or skid steer 110 as is known in the art, depending on the needs and/or wants of a user.

Additionally, the suspended mower device 100 is secured to the compact tractor or the skid steer 110 via an attachment component 102. The attachment component 102 can be any suitable securing means as is known in the art. Typically, the attachment component 102 comprises a tubular rod with opposing first 120 and second 122 ends. The first end 120 is secured to the bucket 118 of the compact tractor or skid steer 110 via any suitable securing means as is known in the art. The first end 120 can be removably secured via clamps, bolts, screws, etc., to the bucket 118. The opposing second end 122 secures to a dual unistrut or dual square tubing 104 or another suitable component. Thus, in position, the attachment component 102 supports a mower 108 over inclined areas 112. Accordingly, the mower's foundational stability is vested in its primary attachment to the front bucket 118 of a compact tractor or skid steer 110.

Furthermore, the attachment component 102 is then secured to a dual unistrut or dual square tubing 104. The attachment component 102 is secured to the dual unistrut or dual square tubing 104 via any suitable securing means as is known in the art, such as welding, bolts, screws, etc. The dual unistrut or dual square tubing 104 serves as a frame and is the anchor point for the chains 106 that secure the mower 108. Specifically, the dual unistrut or dual square tubing 104 comprises a pair of tubular bars 124 arranged in a parallel configuration secured to a horizontal support bar 126 creating the frame. The pair of tubular bars 124 and horizontal support bar 126 would typically be welded together in an H-shape or other suitable configuration to create the frame support for the device 100. Further, the dual unistrut or dual square tubing 104 can be any suitable size and shape as is known in the art, depending on the size and shape of the attached mower 108.

Figure 2:
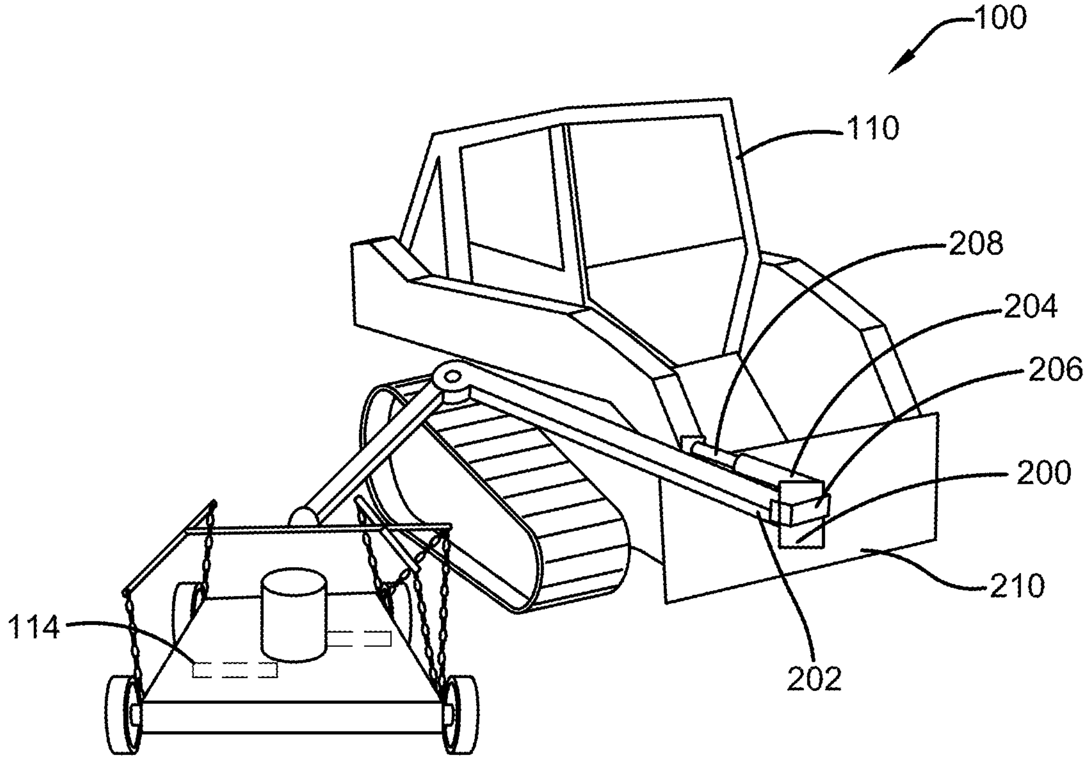
FIG. 2 illustrates a perspective view of one embodiment of the suspended mower device of the present invention showing how the motor is attached via the attachment component in accordance with the disclosed architecture.

As shown in FIG. 2, the device 100 is secured to a compact tractor or a skid steer 110 without a bucket 118 via a quick connect/disconnect component 200. Typically, the quick connect/disconnect component 200 comprises a bar 202 with two hooks 204 with two movable wedges 206 secured on it. The two hooks 204 are secured over a round, metal bar 208 positioned on the front 210 of the compact tractor or skid steer 110. The movable wedges 206 are positioned under the hook 204 and slide up behind the metal bar 208 and are secured in place via screws or other suitable fasteners as is known in the art. The wedges 206 act to retain the hooks 204 on the metal bar 208 of the compact tractor or skid steer 110. The quick connect/disconnect component 200 would be utilized when the compact tractor or skid steer 110 does not have a bucket 118 or has a hydraulic boom extension, etc.

Figure 3:
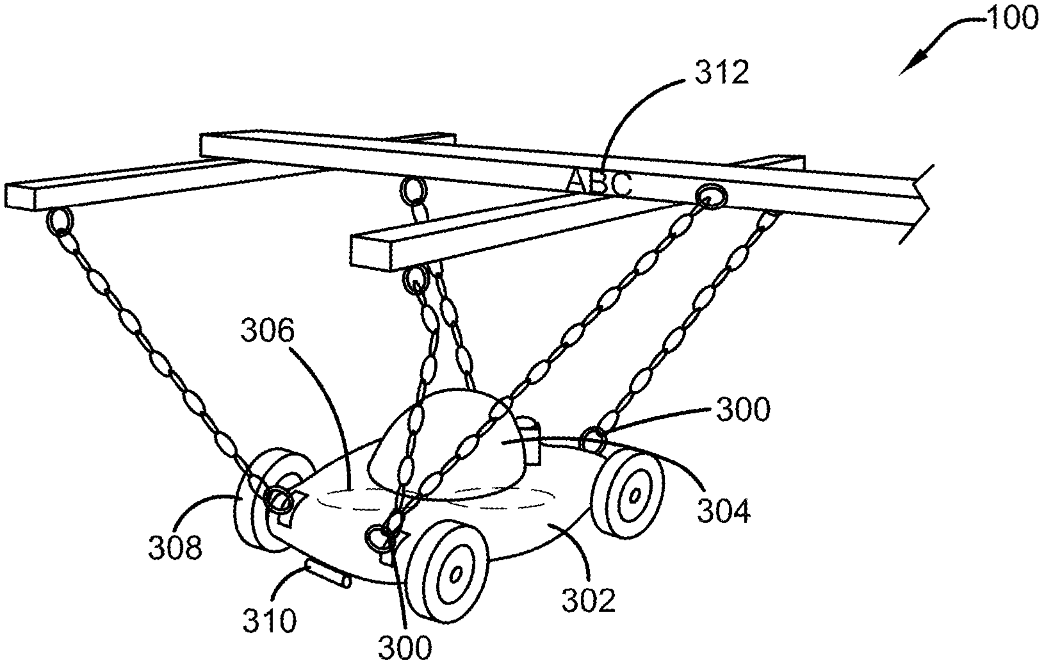
FIG. 3 illustrates a perspective view of one embodiment of the suspended mower device of the present invention showing the mower suspended via chains in accordance with the disclosed architecture.

As shown in FIG. 3, the dual unistrut or dual square tubing 104 is then secured to a plurality of chains 106, which is then secured to the mower 108. The plurality of chains 106 are secured to the dual unistrut or dual square tubing 104 via a ring, clevis, or a hook, etc., or any other suitable securing means as is known in the art. The chains 106 can be adjusted in terms of their length, from 12 to 60 inches, and ensure that the mower 108 retains a forward orientation and movement, regardless of the terrain's angular variations. Anchored at the terminal points 300 of the chains 106 is a mower 108. The chains 106 are secured to the mower 108 via a ring, clevis, or a hook, etc., or any other suitable securing means as is known in the art.

Further, the mower 108 of the device 100 is a grass trimming tool composed of a wheeled or hovering platform 302 with a central motor 304 which can be gas powered or hydraulic, and a rotary blade mechanism 306. The rotary blade mechanism 306 delivers the actual mowing action. As the mower 108 hovers above the surface, the cutting blades 306 consistently engage with the grass 116, ensuring an even cut. Further, the mower 108 includes a set of diminutive wheels 308 which are affixed to the mower's base 302. The wheels 308 offer stabilization on all terrains. The wheels 308 can be any suitable wheels as is known in the art.

Additionally, the mower 108 comprises adjustable rollers 310 between the wheels 308, which act as guides. The adjustable rollers 310 ensure that the mower's orientation remains level throughout its operation. The adjustable rollers 310 can be any suitable size and shape as is known in the art and are typically cylinders that rotate around a central axis to guide the mower 108 in the desired direction. Rollers allow smooth forward progression over level and rough terrains.

In yet another embodiment, the suspended mower device 100 comprises a plurality of indicia 312. The attachment component 102 of the device 100 may include advertising, a trademark, or other letters, designs, or characters, printed, painted, stamped, or integrated into the attachment component 102, or any other indicia 312 as is known in the art. Specifically, any suitable indicia 312 as is known in the art can be included, such as but not limited to, patterns, logos, emblems, images, symbols, designs, letters, words, characters, animals, advertisements, brands, etc., that may or may not be mower, tractor, or brand related.

Figure 4:
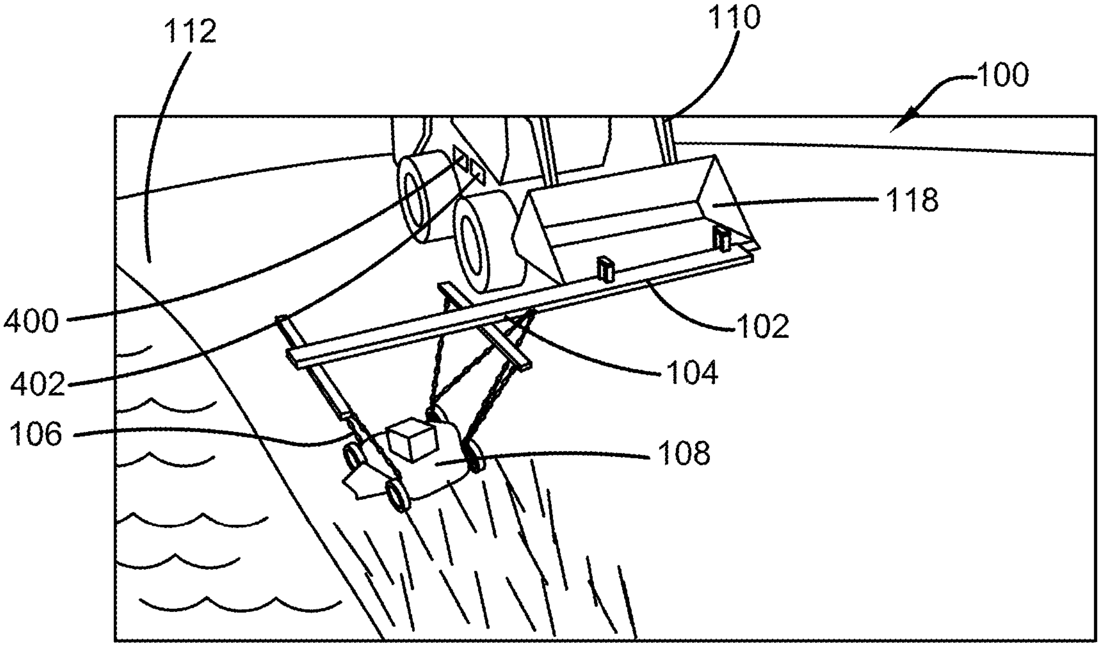
FIG. 4 illustrates a perspective view of one embodiment of the suspended mower device of the present invention showing the mower suspended on a slope in accordance with the disclosed architecture.

As shown in FIG. 4, the compact tractor or the skid steer 110 employs a hydrostatic drive 400. Thus, for optimal maneuverability, the device 100 is ideally operated in conjunction with the hydrostatic drive 400 of the compact tractor or skid steer 110. Such an arrangement provides nuanced control over the mower's speed, which is indispensable when navigating tricky terrains, such as inclines and steep slopes 112. Ideally, the hydrostatic drive 400 will vary speed and maintain best cutting performance of the mower 108.

Further, the device 100 utilizes the compact tractor or the skid steer's bucket controls 402. Specifically, a user can deftly adjust the mower's height, angle, and orientation via the bucket controls 402, thus ensuring precision in every movement of the mower 108. Accordingly, the user merely activates the bucket controls 402 which not only raise and lower and adjust orientation of the bucket 118, it simultaneously raises and lowers the mower 108 and adjusts the orientation of the mower 108 in regard to the inclined slope 112.

Figure 5:
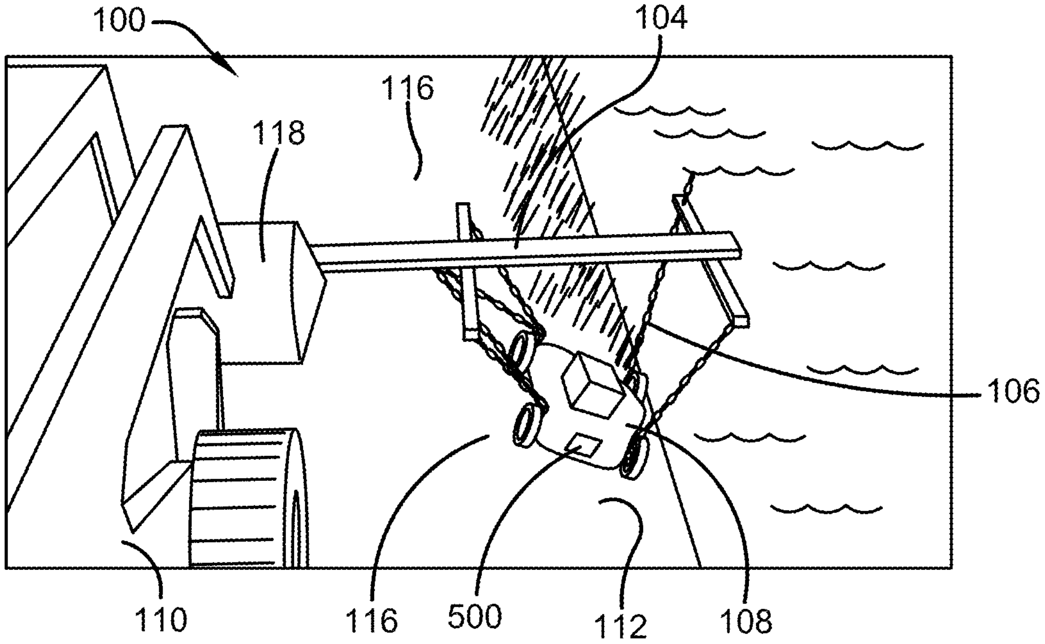
FIG. 5 illustrates a perspective view of one embodiment of the suspended mower device of the present invention showing the device in use on an incline near a pond or river in accordance with the disclosed architecture.

As shown in FIG. 5, the mower 108 is driven by the hydraulic motor 500 from the compact tractor or skid steer 110. In another embodiment, the mower 108 is gas powered. Accordingly, the suspended mower device 100 with its hovering capability promises an even grass to cut across varied terrains. By melding the power of a compact tractor 110 with the precision of a hovering mechanism, the device 100 effortlessly blends efficiency, safety, and precision.

In yet another embodiment, the suspended mower device 100 is an industrial configuration for commercial use. Further, in one embodiment, the suspended mower device 100 is a removable attachment for various compact tractors and/or skid steers 110. In another embodiment, the suspended mower device 100 is a permanent attachment for a compact tractor or skid steer 110.

Figure 6:
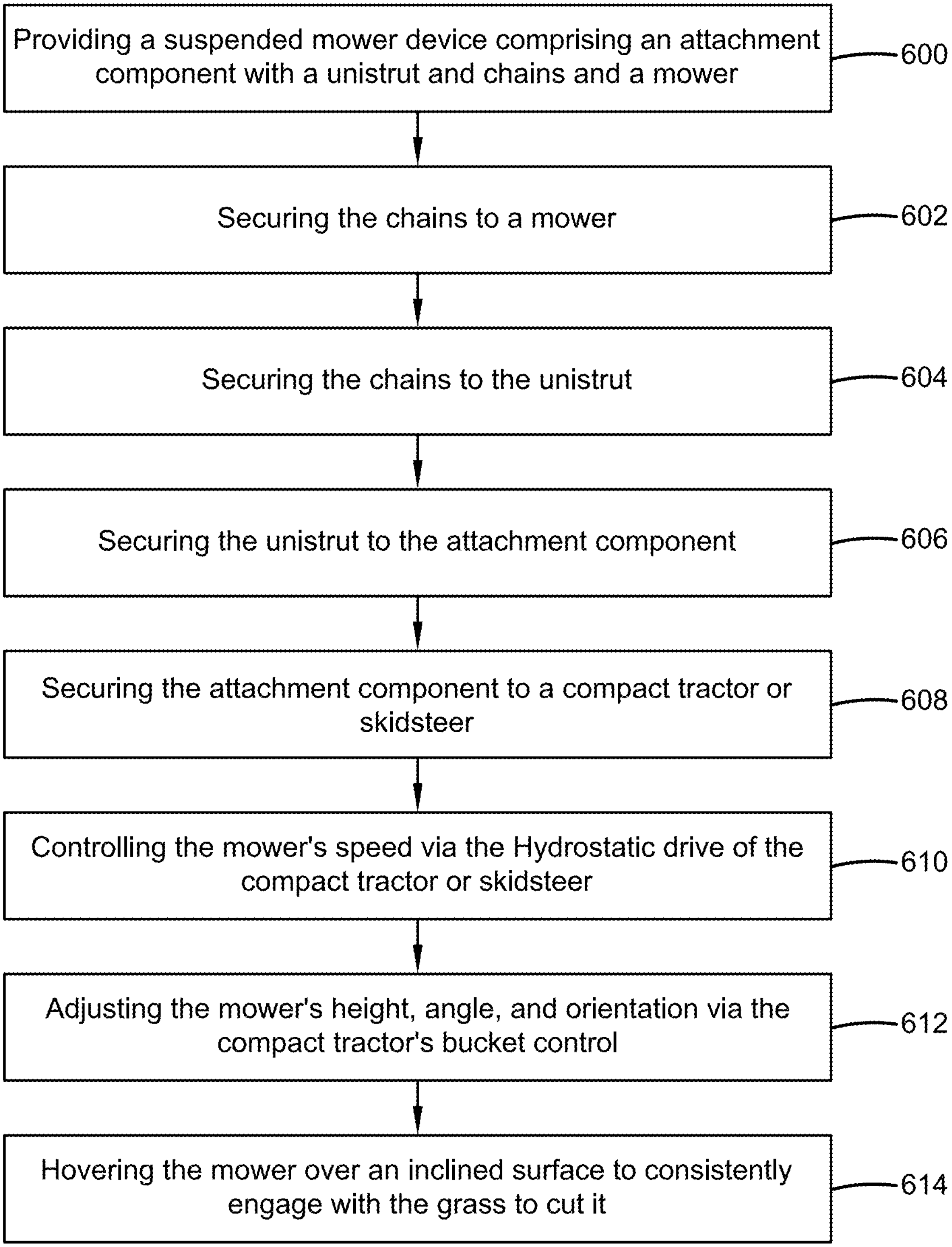
FIG. 6 illustrates a flowchart showing the method of suspending a motor to mow a sloped or inclined area in accordance with the disclosed architecture.

FIG. 6 illustrates a flowchart of the method of suspending a motor to mow a sloped or inclined area. The method includes the steps of at 600, providing a suspended mower device comprising an attachment component with a dual unistrut or dual square tubing and chains and a mower. The method also comprises at 602, securing the chains to the mower. Further, the method comprises at 604, securing the chains to the dual Unistrut or dual square tubing. The method also comprises at 606, securing the dual unistrut or dual square tubing to the attachment component. The method also comprises at 608, securing the attachment component to a compact tractor or skid steer. The method comprises at 610, controlling the mower's speed via the hydrostatic drive of the compact tractor or skid steer. Further, the method comprises at 612, adjusting the mower's height, angle and orientation via the compact tractor's bucket control. Finally, the method comprises at 614, hovering the mower over an inclined surface to consistently engage with the grass to cut it.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "suspended mower device", "mower device", and "device" are interchangeable and refer to the suspended mower device 100 of the present invention.

Notwithstanding the forgoing, the suspended mower device 100 of the present invention can be of any suitable size and configuration as is known in the art without affecting the overall concept of the invention, provided that it accomplishes the above stated objectives. One of ordinary skill in the art will appreciate that the suspended mower device 100 as shown in FIGS. 1-6 is for illustrative purposes only, and that many other sizes and shapes of the suspended mower device 100 are well within the scope of the present disclosure. Although the dimensions of the suspended mower device 100 are important design parameters for user convenience, the suspended mower device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A suspended mower device that provides a user with a tool for mowing sloped or inclined areas, the suspended mower device comprising:
- an attachment component;
- a fixed frame or dual square tubing; and
- a mower;
- wherein the attachment component is secured to a compact tractor or a skid steer;
- wherein the attachment component is secured to the fixed frame or dual square tubing;
- wherein the fixed frame or dual square tubing is secured to a mower;
- wherein the attachment component is anchored to a front bucket of the compact tractor or skid steer; and
- further wherein the mower hovers above a surface to cut grass on an inclined slope.

2. The suspended mower device of claim 1, wherein the attachment component comprises a tubular rod with opposing first and second ends.

3. The suspended mower device of claim 2, wherein the first end is secured to the front bucket of the compact tractor or skid steer via clamps, screws, or bolts.

4. The suspended mower device of claim 3, wherein the opposing second end secures to the fixed frame or dual square tubing.

5. The suspended mower device of claim 4, wherein the fixed frame or dual square tubing serves as a frame and is an anchor point for a plurality of chains which secure the mower.

6. The suspended mower device of claim 5, wherein the fixed frame or dual square tubing comprises a pair of tubular bars arranged in a parallel configuration secured to a horizontal support bar creating the frame.

7. The suspended mower device of claim 6, wherein the plurality of chains can be adjusted in terms of their length and ensure that the mower retains a forward orientation and movement, regardless of a terrain's angular variations.

8. The suspended mower device of claim 7, wherein anchored at terminal points of the plurality of chains is a mower.

9. The suspended mower device of claim 8, wherein the mower is a grass trimming tool comprised of a base with a central motor which can be gas powered or hydraulic, and a rotary blade mechanism for cutting the grass.

10. The suspended mower device of claim 9, wherein the mower includes a set of diminutive wheels which are affixed to the mower's base.

11. The suspended mower device of claim 10, wherein the mower comprises adjustable rollers between the set of diminutive wheels, which act as guides.

12. The suspended mower device of claim 11, wherein the compact tractor or the skid steer employs a hydrostatic drive which is operated in conjunction with the mower to control the mower's speed.

13. A suspended mower device that provides a user with a tool for mowing sloped or inclined areas, the suspended mower device comprising:

an attachment component that comprises a tubular rod with opposing first and second ends;

a fixed frame or dual square tubing that comprises a pair of tubular bars arranged in a parallel configuration secured to a horizontal support bar creating a frame; and a mower which is a grass trimming tool comprised of a base with a central motor which can be gas powered or hydraulic, a rotary blade mechanism for cutting grass, and a set of wheels; and wherein the first end of the attachment component is secured to a front bucket of a compact tractor or skid steer via clamps, screws, or bolts;

wherein the opposing second end secures to the fixed frame or dual square tubing;

wherein the fixed frame or dual square tubing serves as the frame and is anchor point for a plurality of chains which secure the mower;

wherein the plurality of chains can be adjusted in terms of their length and ensure that the mower retains a forward orientation and movement, regardless of a terrain's angular variations;

wherein anchored at terminal points of the plurality of chains is a mower;

wherein the mower comprises adjustable rollers between the set of wheels, which act as guides;

wherein the mower hovers above a surface to cut grass on an inclined slope; and further wherein the compact tractor or the skid steer employs a hydrostatic drive which is operated in conjunction with the mower to control the mower's speed.

14. The suspended mower device of claim 13, wherein a user can adjust the mower's height, angle, and orientation via the compact tractor or the skid steer's bucket controls.

15. The suspended mower device of claim 13 further comprising a plurality of indicia.

16. The suspended mower device of claim 13, wherein the mower is driven by a hydraulic motor from the compact tractor or skid steer.

17. The suspended mower device of claim 13, wherein the mower is gas powered.

18. The suspended mower device of claim 13, wherein a quick connect/disconnect component is used to secure the fixed frame or dual square tubing to the compact tractor or the skid steer without a bucket.

19. A method of suspending a motor to mow a sloped or inclined area, the method comprising the following steps:

providing a suspended mower device comprising an attachment component with a fixed frame or dual square tubing and chains and a mower;

securing the chains to the mower;

securing the chains to the fixed frame or dual square tubing;

securing the fixed frame or dual square tubing to the attachment component;

securing the attachment component to a compact tractor or skid steer;

controlling the mower's speed via a hydrostatic drive of the compact tractor or skid steer;

adjusting the mower's height, angle and orientation via the compact tractor's bucket control; and hovering the mower over an inclined surface to consistently engage with the grass to cut it.

* * * * *